United States Patent
Underwood

(10) Patent No.: US 8,337,135 B2
(45) Date of Patent: Dec. 25, 2012

(54) APPARATUS, SYSTEM AND METHOD FOR TOWING A VEHICLE

(76) Inventor: Warren Underwood, Suisun City, CA (US)

( * ) Notice: Subject to any disclaimer, the term of this patent is extended or adjusted under 35 U.S.C. 154(b) by 305 days.

(21) Appl. No.: 12/583,634

(22) Filed: Aug. 24, 2009

(65) Prior Publication Data
US 2011/0044793 A1 Feb. 24, 2011

(51) Int. Cl.
*B65G 7/00* (2006.01)
(52) U.S. Cl. .................. 414/426; 414/815; 280/79.4
(58) Field of Classification Search ............... 414/815, 414/235, 426, 429, 462, 234, 241, 463, 563; 248/503, 352; 280/402, 79.4
See application file for complete search history.

(56) References Cited

U.S. PATENT DOCUMENTS

| | | | |
|---|---|---|---|
| 1,617,839 A * | 2/1927 | Fennell | 188/32 |
| 2,943,863 A * | 7/1960 | Flournoy et al. | 280/79.11 |
| 3,428,332 A * | 2/1969 | McCance | 280/402 |
| 3,576,167 A * | 4/1971 | Macomber | 414/352 |
| 3,756,616 A * | 9/1973 | Sapp, Sr. | 280/79.4 |
| 4,596,506 A * | 6/1986 | Burgardt et al. | 414/426 |
| 4,797,057 A | 1/1989 | Shoup et al. | |
| 4,798,509 A | 1/1989 | Bubik | |
| 4,968,052 A | 11/1990 | Alm et al. | |
| 4,993,909 A * | 2/1991 | Hamman | 414/563 |
| 5,090,718 A * | 2/1992 | Kauffman | 280/402 |
| 5,105,517 A | 4/1992 | Barnow | |
| 5,123,802 A * | 6/1992 | Bell | 414/563 |
| 5,387,001 A * | 2/1995 | Hull et al. | 280/402 |
| 5,540,540 A | 7/1996 | Peterson | |
| 5,628,609 A | 5/1997 | Nespor | |
| 5,692,871 A | 12/1997 | Nespor | |
| 5,716,188 A | 2/1998 | Pigeon | |
| 5,722,810 A | 3/1998 | Young et al. | |
| 5,762,465 A | 6/1998 | Zackovich | |
| 5,782,596 A | 7/1998 | Young et al. | |
| 5,984,616 A * | 11/1999 | Youmans et al. | 414/563 |
| 5,988,974 A | 11/1999 | Zackovich | |
| 6,164,897 A * | 12/2000 | Edwards | 414/537 |
| 6,279,950 B1 | 8/2001 | Armstrong | |
| 6,315,515 B1 | 11/2001 | Young et al. | |
| 6,692,218 B2 * | 2/2004 | Grile | 414/563 |
| 7,156,403 B2 * | 1/2007 | Abbott | 280/79.11 |
| 7,188,856 B2 * | 3/2007 | Maynard | 280/402 |
| 7,494,313 B2 | 2/2009 | Craze | |
| 7,556,468 B2 | 7/2009 | Grata | |
| 7,694,861 B1 * | 4/2010 | Neely | 224/537 |

* cited by examiner

*Primary Examiner* — Saul Rodriguez
*Assistant Examiner* — Glenn Myers
(74) *Attorney, Agent, or Firm* — Stephen T. Scherrer; Scherrer Patent & Trademark Law, P.C.

(57) ABSTRACT

An apparatus, system and method allows for the towing of a vehicle. Specifically, the apparatus cradles an exposed wheel hub of a vehicle having had a tire removed. The wheel hub sits within the cradle or well, while the apparatus is disposed on a tow truck or a tow dolly. The tow truck or tow dolly safely moves the vehicle without damaging the vehicle.

16 Claims, 6 Drawing Sheets

APPARATUS, SYSTEM AND METHOD FOR TOWING A VEHICLE

BACKGROUND OF THE INVENTION

The present invention generally relates to an apparatus, system and method for towing a vehicle. Specifically, the present invention relates to an apparatus for providing a cradle or well for a vehicle having had a tire removed. An exposed wheel hub sits within the cradle or well, while the cradle or well is disposed on, sits in, or otherwise is held in place on a tow truck or a tow dolly. The tow truck or tow dolly may then safely move the vehicle without damaging the vehicle.

It is, of course, generally known to tow vehicles. Ever since the first vehicle was created, there has been a need to move it, especially when its own primary power system fails or otherwise when the vehicle must be moved without utilizing the primary power system. Specifically, many automobiles have engines that can break down stranding the automobiles. Moreover, in many cases, automobiles are parked or abandoned in improper locations and must be moved without having the ability to start the automobiles, such as if the automobiles are locked or otherwise inaccessible.

A tow truck is a vehicle used to tow other vehicles from one location to another. There are many different types of tow trucks, including boom, hook and chain, wheel-lift, flat bed, and integrated-types of tow trucks, which are typically combinations of the above-listed types.

Boom-type tow trucks are not specifically for towing, but include a boom with a hook and winch that allows the truck for recovering vehicles from ditches, culverts and the like, or otherwise moving a vehicle from a relatively inaccessible location to an accessible location.

Hook and chain tow trucks utilize chains that are looped around a vehicle frame or axle. The vehicle is then drawn aloft by a boom winch to rest against a sling, which typically includes a pair of heavy rubberized mats so the customer's vehicle can be towed on its other axle. Slings may be used for towing vehicles that have been in an accident or have one or two of the front or rear wheels missing or for pickup trucks and other vehicles that have steel bumpers. However, slings are not used as much today because they can scratch or otherwise damage the vehicle as the vehicle is being towed.

A flat-bed tow truck allows the entirety of a vehicle to be removed from the ground and placed on a bed on the back of the truck. The bed may be hydraulically inclined and moved to ground level, allowing a vehicle to be placed on it under its own power or pulled by a winch. While a flat-bed tow truck is useful and provides complete control of a vehicle as it is towed, especially if the vehicle is damaged, it may be difficult to move the vehicle up on to the bed, whether by its own power or by a winch. Moreover, it the vehicle has a tire removed, it may be difficult or impossible to move the vehicle onto the bed without damaging the wheel hub or other parts of the undercarriage of the car.

Modern tow-trucks are typically wheel-lifts, which evolved from the hook and chain technology. A wheel-lift typically is a large metal grid that can be fitted under the front or rear wheels to cradle the tires, drawing the front or rear end of the vehicle clear off the ground by a pneumatic or hydraulic hoist so the vehicle can be towed. Typically, a vehicle may either be rolled onto the yoke or grid of the wheel lift, or the vehicle may be lifted with a hook and chain, as described above, while the yoke or grid of the wheel lift is placed under the tires of the vehicle. This apparatus generally picks up the drive wheels of the vehicle touching only the tires.

However, vehicles that have had one or more tires removed may be damaged by a wheel-lift type of tow truck. Specifically, if a tire has been removed, the exposed wheel hub does not fit within the wheel-lift grid properly. Therefore, parts of the undercarriage of the vehicle not meant to support the weight of the car may contact the yoke or grid of the wheel-lift. This may cause severe damage to the undercarriage of the vehicle as the vehicle is towed. Moreover, if only one tire has been removed, the vehicle may be disposed unevenly on the grid of the wheel-lift, further making towing of the vehicle difficult or causing damage to the vehicle.

A need, therefore, exists for an apparatus, system and method for towing a vehicle. Specifically, a need exists for an apparatus, system and method for towing a vehicle where one or more tires have been removed from the vehicle.

Moreover, a need exists for an apparatus, system and method for towing a vehicle using a wheel-lift tow truck. In addition, a need exists for an apparatus, system and method for towing a vehicle using a wheel-lift tow truck whereby the wheel-lift tow truck does not contact fragile parts of the undercarriage of the vehicle.

Further, a need exists for an apparatus, system and method for towing a vehicle using a wheel-lift tow truck, whereby a cradle or well cradles the wheel hub of a vehicle so that the vehicle, having had one or more tires removed, can be towed without damaging fragile parts of the undercarriage of the vehicle.

Still further, a need exists for an apparatus, system and method for towing a vehicle whereby the vehicle, having had a tire removed, may be properly balanced while being towed by a tow truck.

In addition, a need exists for an apparatus, system and method for towing a vehicle whereby the vehicle is placed on a tow dolly.

Moreover, a need exists for an apparatus, system and method for towing a vehicle whereby the vehicle is towed utilizing a tow dolly, and whereby a cradle or well cradles the wheel hub of the vehicle while the vehicle is placed on the tow dolly.

Further, a need exists for an apparatus, system and method for towing a vehicle, having had a tire removed, whereby the vehicle maintains balance on a tow dolly.

Still further, a need exists for an apparatus, system and method for towing a vehicle using a tow dolly whereby the tow dolly does not contact fragile parts of the undercarriage of the vehicle.

Further, a need exists for an apparatus, system and method for towing a vehicle using a tow dolly, whereby a cradle or well cradles the wheel hub of a vehicle so that the vehicle, having had one or more tires removed, can be towed without damaging fragile parts of the undercarriage of the vehicle.

SUMMARY OF THE INVENTION

The present invention generally relates to an apparatus, system and method for towing a vehicle. Specifically, the present invention relates to an apparatus for providing a cradle or well for a vehicle having had a tire removed. An exposed wheel hub of a vehicle sits within the cradle or well, while the cradle or well is disposed on, sits in, or otherwise is held in place on a wheel-lift tow truck or a tow dolly. The tow truck or tow dolly may then safely move the vehicle without damaging the vehicle.

To this end, in an embodiment of the present invention, an apparatus for holding a wheel hub of a vehicle is provided. The apparatus comprise a main body portion having a first end, a second end and a length between the first end and the second end; a well for receiving a wheel hub of a vehicle, the well disposed between the first end and the second end of the main body portion; and a first holder disposed beneath the first end for contacting a towing device and holding the apparatus on the towing device.

In an embodiment, the apparatus further comprises an elongated bar disposed adjacent the main body portion and the well.

In an embodiment, the well is arcuate between the first end and the second end of the main body portion.

In an embodiment, the first holder comprises a flange disposed downwardly for contacting the towing device.

In an embodiment, the main body portion comprises a first portion and a second portion wherein the well bridges the first portion and the second portion.

In an embodiment, the apparatus further comprises a second holder disposed beneath the second end of the main body portion for contacting the towing device and holding the apparatus on the towing device.

In an alternate embodiment of the present invention, a system for holding a wheel hub of a vehicle for towing the vehicle is provided. The system comprises a towing device having a vehicle wheel receptacle comprising a first crossbar and a second crossbar and a space having a length between the first crossbar and the second crossbar for holding the tire of a vehicle during towing; and an apparatus comprising a main body portion having a length, a first end and a second end and a well for receiving a wheel hub of a vehicle, the well disposed between the first end and the second end of the main body portion, wherein the apparatus spans the length of the space between the first crossbar and the second crossbar of the wheel receptacle.

In an embodiment, the system further comprises a holder disposed beneath the first end of the main body portion of the apparatus for contacting the first crossbar of the wheel receptacle.

In an embodiment, the system further comprises a first holder disposed beneath the first end of the main body portion of the apparatus for contacting the first crossbar of the wheel receptacle; and a second holder disposed beneath the second end of the main body portion of the apparatus for contacting the second crossbar of the wheel receptacle.

In an embodiment, the towing device tow truck having a wheel lift, wherein the wheel receptacle is a wheel grid and further wherein the wheel receptacle is part of the wheel lift.

In an embodiment, the towing device is a tow dolly, wherein the wheel receptacle is part of the tow dolly.

In an embodiment, the system further comprises a vehicle having an exposed wheel hub wherein the wheel hub is disposed within the well of the apparatus.

In an embodiment, the system further comprises an elongated bar disposed adjacent the main body portion and the well.

In an embodiment, the well is arcuate between the first end of the main body portion and the second end of the main body portion of the apparatus.

In an embodiment, the main body portion comprises a first portion and a second portion wherein the well bridges the first portion and the second portion.

In an alternate embodiment of the present invention, a method for holding a wheel hub on a vehicle is provided. The method comprises the steps of providing a towing device having a vehicle wheel receptacle comprising a first crossbar and a second crossbar and a space having a length between the first crossbar and the second crossbar for holding the tire of a vehicle during towing; and placing an apparatus across the wheel receptacle and spanning the length of the space between the first crossbar and the second crossbar, the apparatus having a main body portion having a length, a first end and a second end and further wherein the apparatus has a well for receiving a wheel hub of a vehicle disposed between the first end and the second end of the apparatus.

In an embodiment, the method further comprises the steps of providing a vehicle having an exposed wheel hub; and placing the wheel hub within the well of the apparatus.

In an embodiment, the method further comprises the steps of providing a holder disposed beneath the first end of the main body portion of the apparatus; and disposing the holder on the first crossbar of the wheel receptacle.

In an embodiment, the towing device tow truck having a wheel lift, wherein the wheel receptacle is a wheel grid and further wherein the wheel receptacle is part of the wheel lift.

In an embodiment, the towing device is a tow dolly, wherein the wheel receptacle is part of the tow dolly.

In an embodiment, the well is arcuate between the first end of the main body portion of the apparatus and the second end of the main body portion of the apparatus.

It is, therefore, an advantage of the present invention to provide an apparatus, system and method for towing a vehicle. Specifically, it is an advantage of the present invention to provide an apparatus, system and method for towing a vehicle where one or more tires have been removed from the vehicle.

Moreover, it is an advantage of the present invention to provide an apparatus, system and method for towing a vehicle using a wheel-lift tow truck. In addition, it is an advantage of the present invention to provide an apparatus, system and method for towing a vehicle using a wheel-lift tow truck whereby the wheel-lift tow truck does not contact fragile parts of the undercarriage of the vehicle.

Further, it is an advantage of the present invention to provide an apparatus, system and method for towing a vehicle using a wheel-lift tow truck, whereby a cradle or well holds the wheel hub of a vehicle so that the vehicle, having had one or more tires removed, can be towed without damaging fragile parts of the undercarriage of the vehicle.

Still further, it is an advantage of the present invention to provide an apparatus, system and method for towing a vehicle whereby the vehicle, having had a tire removed, may be balanced while being towed by a tow truck.

In addition, it is an advantage of the present invention to provide an apparatus, system and method for towing a vehicle whereby the vehicle is placed on a tow dolly.

Moreover, it is an advantage of the present invention to provide an apparatus, system and method for towing a vehicle whereby the vehicle is towed utilizing a tow dolly, and whereby a cradle or well cradles the wheel hub of the vehicle when the vehicle is placed on the tow dolly.

Further, it is an advantage of the present invention to provide an apparatus, system and method for towing a vehicle having had a tire removed whereby the vehicle maintains balance on a tow dolly.

Still further, it is an advantage of the present invention to provide an apparatus, system and method for towing a vehicle using a tow dolly whereby the tow dolly does not contact fragile parts of the undercarriage of the vehicle.

Further, it is an advantage of the present invention to provide an apparatus, system and method for towing a vehicle using a tow dolly, whereby a cradle or well cradles the wheel hub of a vehicle so that the vehicle, having had one or more tires removed, can be towed without damaging fragile parts of the undercarriage of the vehicle.

Additional features and advantages of the present invention are described in, and will be apparent from, the detailed description of the presently preferred embodiments and from the drawings.

DETAILED DESCRIPTION OF THE PRESENTLY PREFERRED EMBODIMENTS

The present invention generally relates to an apparatus, system and method for towing a vehicle. Specifically, the present invention relates to an apparatus for providing a cradle or well for a vehicle having had a tire removed. An exposed wheel hub of the vehicle sits within the cradle or well, while the cradle or well is disposed on, sits in or otherwise is held in place on a tow truck or a tow dolly. The tow truck or tow dolly may then safely move the vehicle without damaging the vehicle.

Figure 1:
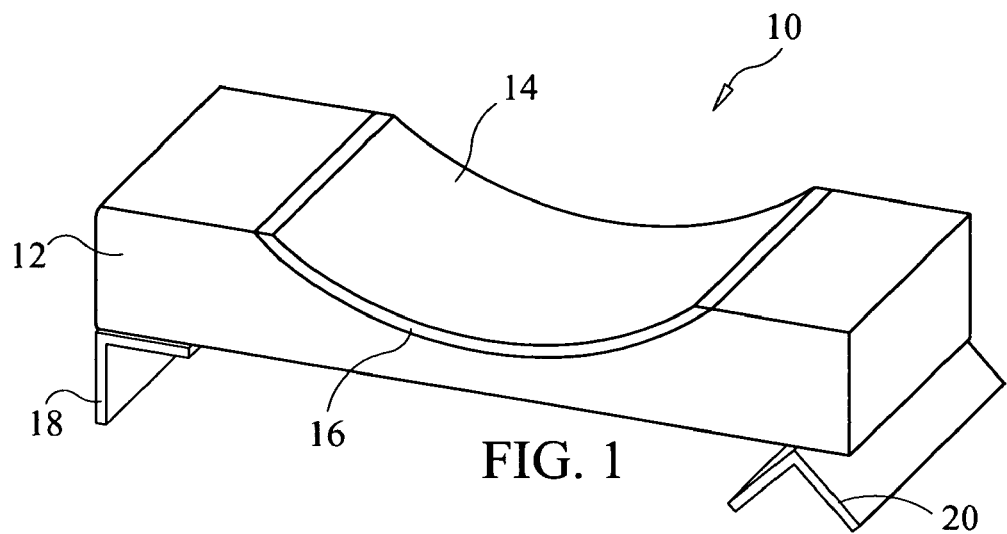
FIG. 1 illustrates a perspective view of a vehicle wheel hub cradle apparatus in an embodiment of the present invention.

Now referring to the figures, wherein like numerals refer to like parts, FIG. 1 illustrates a vehicle wheel hub cradle apparatus 10. The cradle apparatus 10 may include a main body portion 12 and a cradle or well portion 14. The main body portion may be a block of steel or other material providing a great deal of strength to the cradle apparatus 10, thereby allowing the weight of a vehicle to be disposed thereon without damaging the apparatus 10. The cradle portion 14 may be an arcuate portion disposed longitudinally in the main body portion 12 to provide a place for a vehicle wheel hub, wherein the vehicle has had a tire removed, to be placed thereon and to support the vehicle wheel hub. The cradle portion 14 may be carved into the main body portion 12. Moreover, the cradle portion 14 may include an arcuate sheet 16 made of metal or other rigid and/or resilient material disposed thereon providing further support and strength. Moreover, the arcuate sheet 16 may have a tread or roughened area (not shown) thereby providing a non-slip surface for a wheel hub to maintain its position when disposed on the cradle portion 14.

The main body portion 12 may be preferably made from a continuous block of steel. However, the main body portion 12 may be made from a plurality of rigid parts, such as a frame of support bars with steel sheets or blocks to form the entirety of the main body portion 12. In addition, while the main body portion 12 is shown as a continuous piece from one end to the other end, the main body portion 12 may include a first portion on a first end of the main body portion 12 and a second portion on a second end of the main body portion 12 that is discontinuous, wherein the arcuate sheet 16 may form the cradle portion 14 and may bridge the first portion and the second portion (not shown).

The cradle apparatus 10 may further include a pair of connector supports or holders 18, 20 disposed on a bottom side of the cradle apparatus 10. The connector supports 18, 20 may allow the cradle apparatus 10 to be disposed on a wheel-lift of a tow truck without movement of the apparatus. As shown, the connector support 18 is an "L"-shaped bar for allowing the cradle apparatus 10 to be disposed on a support bar of a wheel-lift having a squared surface configuration. Alternatively, connector support 20 is a "V"-shaped bar for allowing the cradle apparatus 10 to be disposed on a support bar of a wheel-lift having a diamond-shaped surface configuration. It should be noted that the connector supports 18, 20 may be any shape to fit support bars of a wheel-lift, as apparent to one having ordinary skill in the art.

The connector supports 18, 20 may be made from steel or other material providing strength and support when disposed on a wheel-lift of a tow truck, and may be welded to the main body portion 12, or otherwise rigidly disposed on the underside of the main body portion 12. Preferably, the connector apparatuses 18, 20 run the entirety of the width-wise distance of the main body portion 12.

Figure 2:
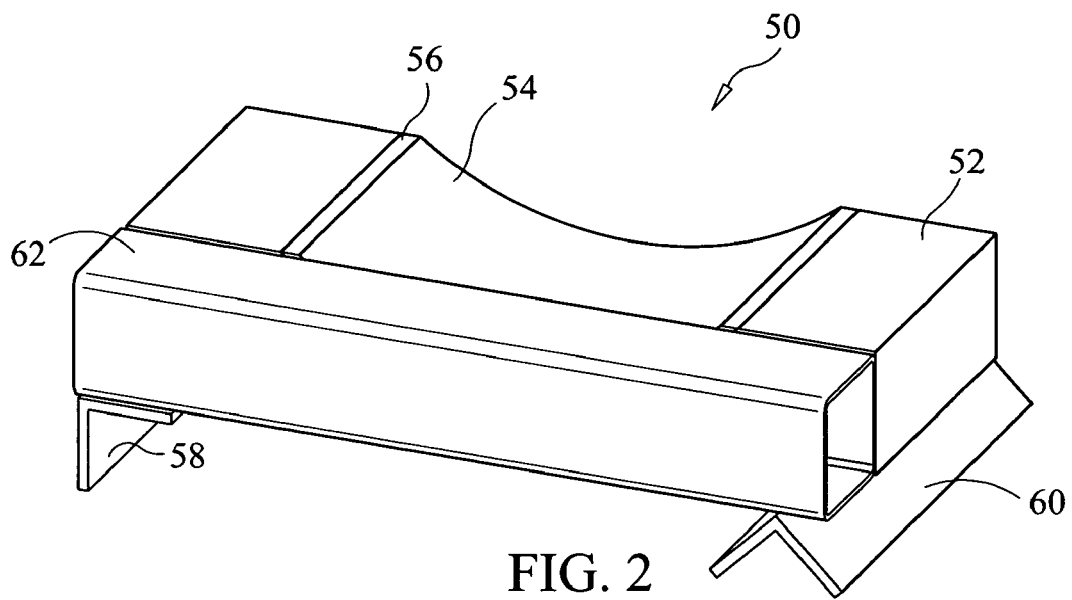
FIG. 2 illustrates a perspective view of a vehicle wheel hub cradle apparatus in an alternate embodiment of the present invention.

FIG. 2 illustrates an alternate embodiment of a cradle apparatus 50 having a main body portion 52 and a cradle or well portion 54. The main body portion 52 may be a block of steel or other material providing a great deal of strength to the cradle apparatus 50, thereby allowing the weight of a vehicle to be disposed thereon without damaging the apparatus 50. The cradle portion 54 may be an arcuate portion disposed longitudinally in the main body portion 52 to provide a place for a vehicle wheel hub of vehicle having had a tire removed to be placed thereon and to cradle the vehicle wheel hub and to support the vehicle. The cradle portion 54 may be carved into the main body portion 52. Moreover, the cradle portion may include an arcuate sheet 56, made of metal or other rigid and resilient material, disposed thereon providing further support and strength. Moreover, the arcuate sheet 56 may have a tread or roughened area (not shown) thereby providing a non-slip surface for a wheel hub to maintain its position when disposed on the cradle portion 54.

The main body portion 52 may be preferably made from a continuous block of steel. However, the main body portion 52 may be made from a plurality of rigid parts, such as a frame of support bars with steel sheets or blocks to form the entirety of the main body portion 52. In addition, while the main body portion 52 is shown as a continuous piece from one longitudinal end to the other longitudinal end, the main body portion 52 may include a first portion on a first end of the main body portion 52 and a second portion on a second end of the main body portion 52 that is discontinuous between the first portion and the second portion, wherein the arcuate sheet 56 may form the cradle portion 54 and may bridge the first portion and the second portion (not shown).

The cradle apparatus 50 may further include a support bar 62 disposed on a side of the main body portion 52 and the cradle portion 54. The support bar 62 may provide further strength and rigidity to the cradle apparatus 50. Moreover, the support bar 62 may keep an exposed wheel hub disposed thereon from slipping off the cradle portion 54. Specifically, the support bar 62 may act as a block for the wheel hub disposed on the cradle portion 54. The support bar may preferably be made of steel, although any other material may be used apparent to one having ordinary skill in the art to provide the strength and rigidity to the apparatus 50. Preferably, the support bar 62 may be welded or otherwise rigidly adhered to the side of the main body portion 52. More preferably, the support bar 62 may be welded or otherwise rigidly adhered to both the side of the main body portion 52 and the cradle portion 54, including the arcuate sheet 56.

The cradle apparatus 50 may further include a pair of connector supports 58, 60 disposed on a bottom side of the cradle apparatus 50. The connector supports 58, 60 may allow the cradle apparatus 50 to be disposed on a wheel-lift of a tow truck without longitudinal movement thereof. As shown, the connector support 58 is an "L"-shaped bar for allowing the cradle apparatus 50 to be disposed on a support bar of a wheel-lift having a squared surface configuration. Alternatively, connector support 60 is a "V"-shaped bar for allowing the cradle apparatus 50 to be disposed on a support bar of the wheel-lift having a diamond-shaped surface configuration. The connector supports 58, 60 may be made from steel or other material providing strength and support when disposed on a wheel-lift of a tow truck, and may be welded to the main body portion 52, or otherwise rigidly disposed on the underside of the main body portion 52. Preferably, the connector supports 58, 60 run the entirety of the width-wise distance of the main body portion 52. More preferably, the connector supports run the entirety of the width-wise distance of the main body portion 52, including the support bar 62, as illustrated in FIG. 2.

Figure 3:
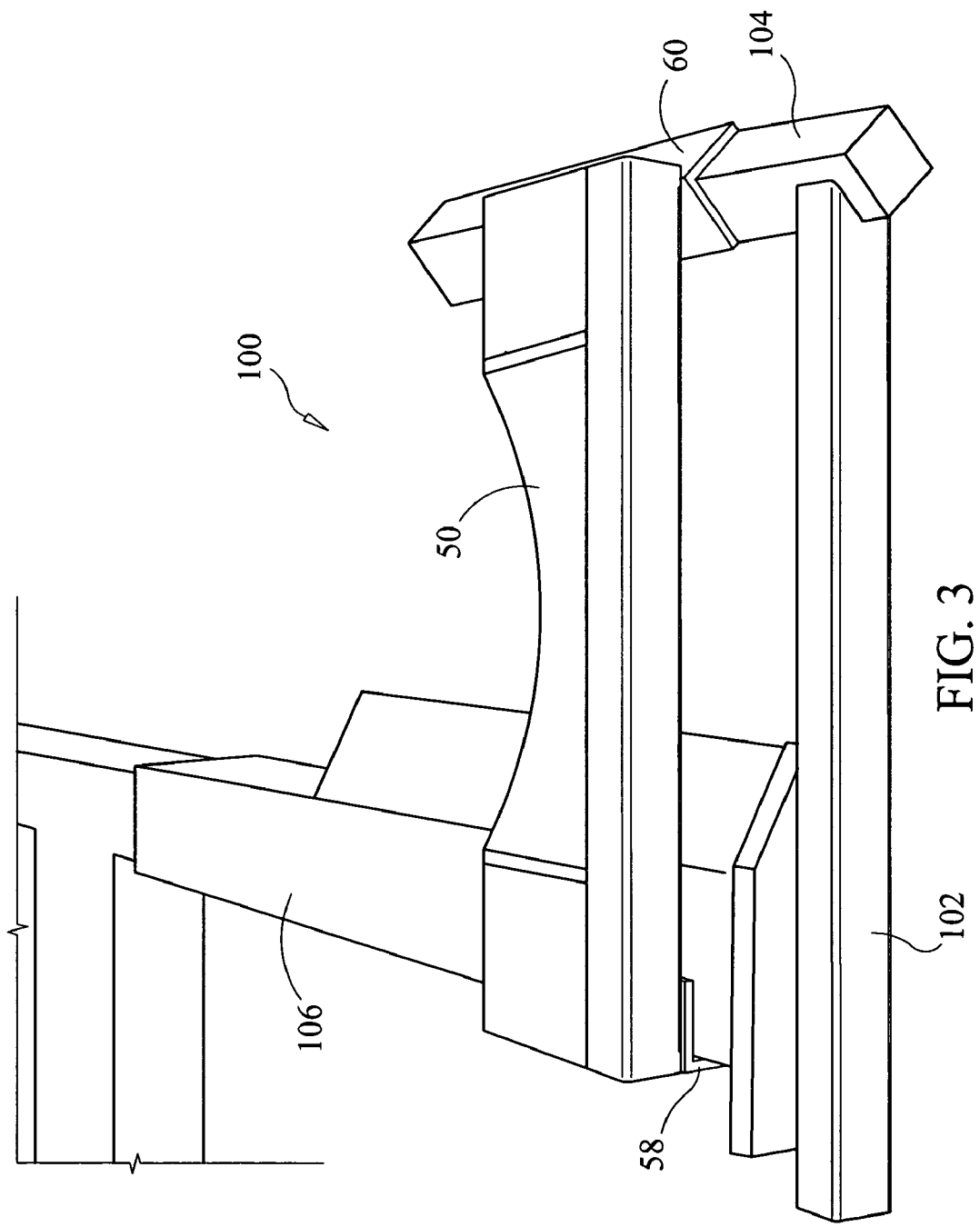
FIG. 3 illustrates a perspective view of a vehicle wheel hub cradle apparatus disposed on a wheel lift of a tow truck in an embodiment of the present invention.

FIG. 3 illustrates a system 100 of a cradle apparatus of the present invention (as shown in FIG. 2) disposed on a wheel-lift of a tow truck. Although FIG. 3 is shown and described with respect to cradle apparatus 50, it should be noted that the apparatus 10 may be utilized in place of the apparatus 50 without detracting from the present invention in any way.

The cradle apparatus 50 may be disposed on a wheel-lift 102 having an "L"-shaped support bar 104 connected to a main lift support bar 106. Without the cradle apparatus 50 disposed thereon, a wheel of a vehicle would typically be supported by the L-shaped support bar 104 and the main lift support bar 106. The L-shaped support bar 104 may be adjusted to lengthen or shorten the space (known as the wheel grid) between the L-shaped support bar 104 and the main lift support bar 106 of the wheel-lift 102. The cradle apparatus 50 (or the cradle apparatus 10) may be disposed on the L-shaped support bar 104 and the main lift support bar 106 and may span the length of the space of the wheel grid. As shown, the connector supports 58, 60 may fit the diamond shape of the L-shaped support bar 104 as well as the square shape of the main lift support bar 106, respectively.

Figure 4:
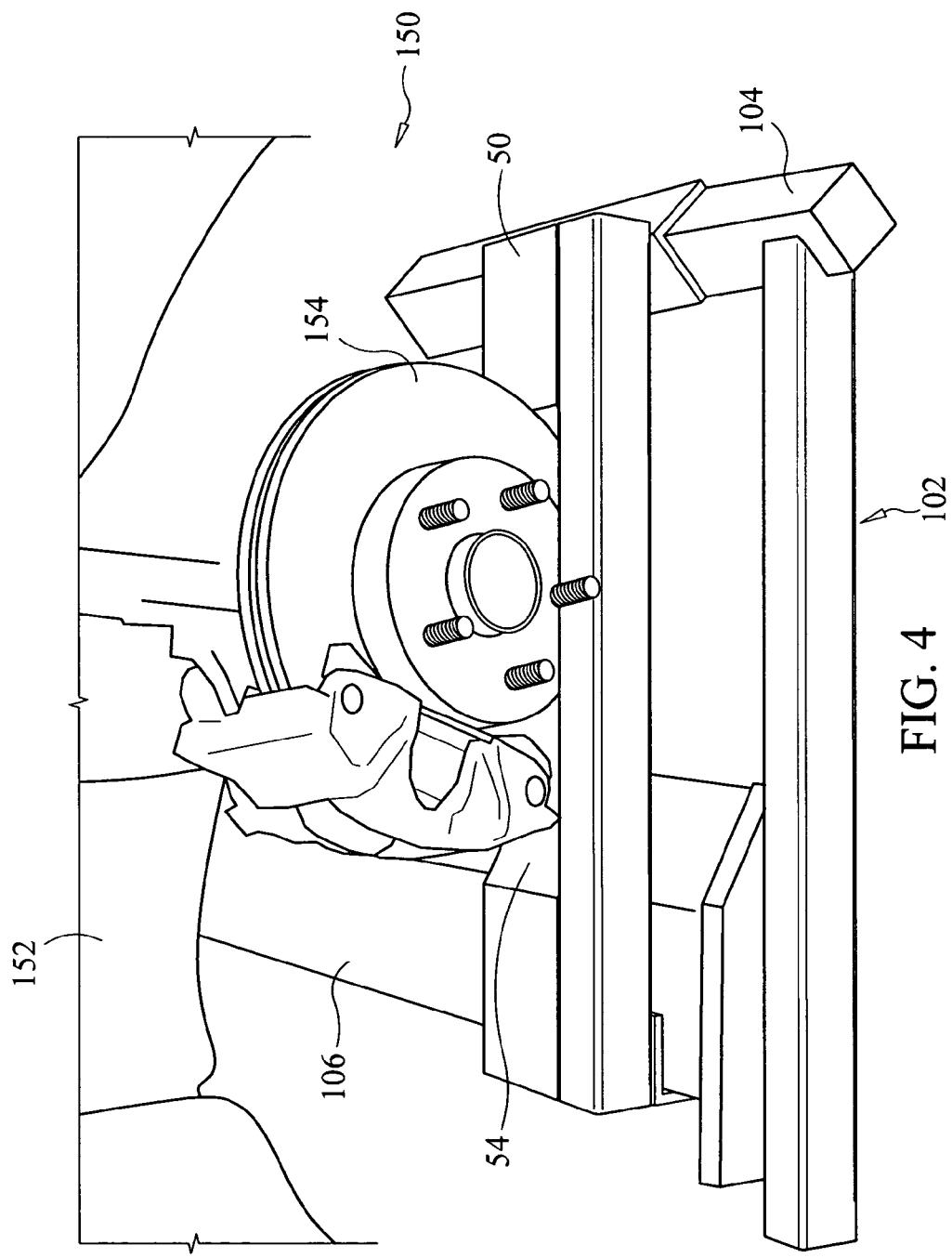
FIG. 4 illustrates a perspective view of a vehicle wheel hub cradle apparatus disposed on a wheel lift of a tow truck having a vehicle wheel hub disposed thereon in an embodiment of the present invention.

FIG. 4 illustrates a system 150 of a cradle apparatus 50 disposed on a wheel-lift of a tow truck having a vehicle disposed thereon. Specifically, the cradle apparatus 50 may be disposed on a wheel lift 102 as described above with respect to FIG. 3. A vehicle 152 may be disposed on the cradle apparatus 50. Specifically, an exposed wheel hub 154 may sit within the cradle portion 54 of the cradle apparatus 50. The cradle apparatus 50, therefore, may hold the weight of the vehicle 152 via the wheel hub 154. Without the cradle apparatus 50, the space between the L-shaped support bar 104 and the main lift support bar 106 would be too great to support the wheel hub, and delicate parts of the undercarriage of the vehicle 152 would rest on the wheel-lift 102, possibly damaging the delicate parts of the vehicle 152.

Figure 5:
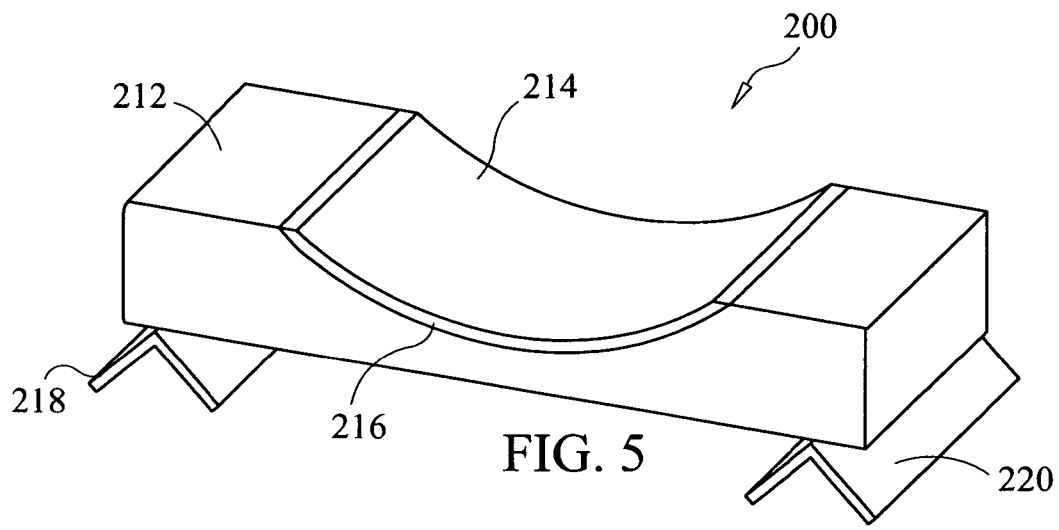
FIG. 5 illustrates a perspective view of a vehicle wheel hub cradle apparatus in an embodiment of the present invention.
Figure 6:
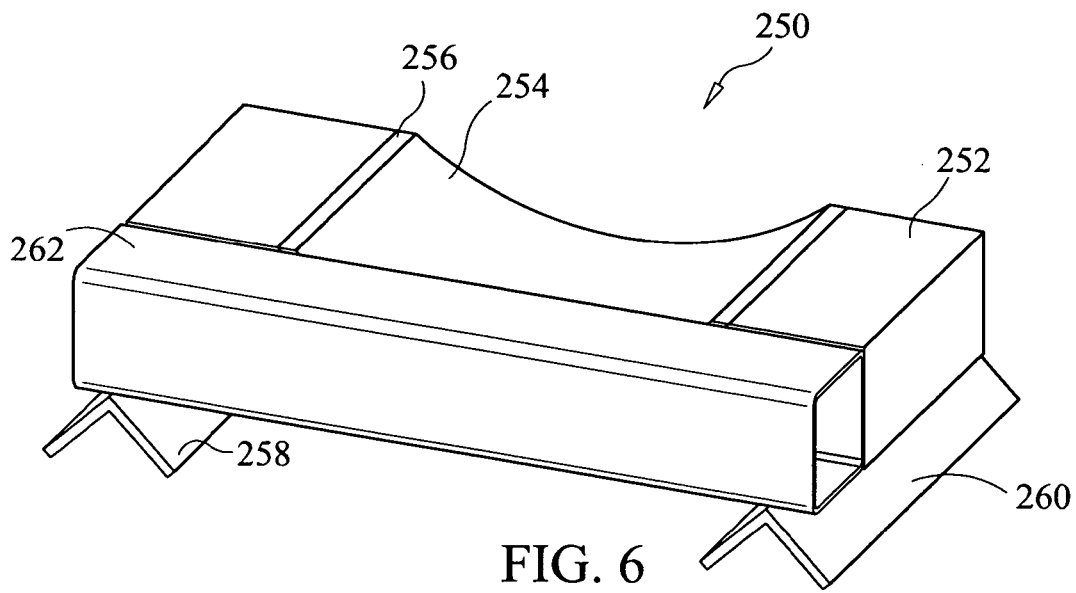
FIG. 6 illustrates a perspective view of a vehicle wheel hub cradle apparatus in an alternate embodiment of the present invention.

FIGS. 5 and 6 illustrate alternate embodiments of the present invention. Specifically, FIG. 5 illustrates a cradle apparatus 200 and FIG. 6 illustrates a cradle apparatus 250, each similar to the cradle apparatuses 10 and 50, described above with respect to FIGS. 1 and 2.

More specifically, the vehicle wheel hub cradle apparatus 200 may include a main body portion 212 and a cradle portion 214. The main body portion 212 may be a block of steel or other material providing a great deal of strength to the cradle apparatus 200, thereby allowing the weight of a vehicle to be disposed thereon without damaging the apparatus 200. The cradle portion 214 may be an arcuate portion disposed longitudinally in the main body portion 212 to provide a place for a vehicle wheel hub, when the vehicle has had a tire removed, to be placed thereon and to support the vehicle wheel hub. The cradle portion 214 may be carved into the main body portion 212. Moreover, the cradle portion may include an arcuate sheet 216 made of metal or other rigid and resilient material disposed thereon providing further support and strength. Moreover, the arcuate sheet 216 may have a tread or roughened area (not shown) thereby providing a non-slip surface for a wheel hub to maintain its position when disposed on the cradle portion 214.

The main body portion 212 may be preferably made from a continuous block of steel. However, the main body portion 212 may be made from a plurality of rigid parts, such as a frame of support bars with steel sheets or blocks to form the entirety of the main body portion 212. In addition, while the main body portion 212 is shown as a continuous piece from one end to the other end, the main body portion 212 may include a first portion on a first end of the main body portion 212 and a second portion on a second end of the main body portion 212 that is discontinuous, wherein the arcuate sheet 216 may form the cradle portion 214 and may bridge the first end portion and the second end portion (not shown).

The cradle apparatus 200 further may include a pair of connector supports or holders 218, 220 disposed on a bottom side of the cradle apparatus 10. The connector supports 218, 220 allow the cradle apparatus 200 to be disposed on a tow dolly that may then be pulled by a tow truck without movement of the apparatus while disposed on the tow dolly. As shown, the connector supports 218, 220 are "V"-shaped bars for allowing the cradle apparatus 200 to be disposed on support bars of a tow dolly having a diamond-shaped surface configuration. The connector supports 218, 220 may be made from steel or other material providing strength and support when disposed on a tow dolly, and may be welded to the main body portion 212, or otherwise rigidly disposed on the underside of the main body portion 212. Preferably, the connector supports 218, 220 run the entirety of the width-wide distance of the main body portion 212.

FIG. 6 illustrates an alternate embodiment of a cradle apparatus 250 having a main body portion 252 and a cradle portion 254. The main body portion 252 may be a block of steel or other material providing a great deal of strength to the cradle apparatus 250, thereby allowing the weight of a vehicle to be disposed thereon without damaging the apparatus 250. The cradle portion 254 may be an arcuate portion disposed longitudinally in the main body portion 252 to provide a place for a wheel hub of a vehicle having had a tire removed to be placed thereon and to cradle the wheel hub and to support the vehicle. The cradle portion 254 may be carved into the main body portion 252. Moreover, the cradle portion may include an arcuate sheet 256 made of metal or other rigid and resilient material disposed thereon providing further support and strength. Moreover, the arcuate sheet 256 may have a tread or roughened area (not shown) thereby providing a non-slip surface for a wheel hub to maintain its position when disposed on the cradle portion 254.

The main body portion 252 may be preferably made from a continuous block of steel. However, the main body portion 252 may be made from a plurality of rigid parts, such as a frame of support bars with steel sheets or blocks to form the entirety of the main body portion 252. In addition, while the main body portion 252 is shown as a continuous piece from one end to the other end, the main body portion 252 may include a first portion on a first end of the main body portion 252 and a second portion on a second end of the main body portion 252 that is discontinuous, wherein the arcuate sheet 256 may form the cradle portion 254 and may bridge the first portion and the second portion (not shown).

The cradle apparatus 250 may further include a support bar 262 disposed on a side of the main body portion 252 and the cradle portion 254. The support bar 262 may provide further strength and rigidity to the cradle apparatus 250. Moreover, the support bar 262 may keep a wheel hub disposed thereon from slipping off the cradle portion 254. Specifically, the support bar 262 may act as a block for the wheel hub disposed on the cradle portion 254. The support bar may preferably be made of steel, although any other material may be used apparent to one having ordinary skill in the art to provide the strength and rigidity to the apparatus 250. Preferably, the support bar 262 may be welded or otherwise rigidly adhered to the side of the main body portion 252. More preferably, the support bar 262 may be welded or otherwise rigidly adhered to both the side of the main body portion 252 and the cradle portion 254, including the arcuate sheet 256.

The cradle apparatus 250 may further include a pair of connector supports or holders 258, 260 disposed on a bottom side of the cradle apparatus 250. The connector supports 258, 260 may allow the cradle apparatus 250 to be disposed on a tow dolly without longitudinal movement thereof. As shown, the connector supports 258, 260 are "V"-shaped bars for allowing the cradle apparatus 250 to be disposed on support bars of a tow dolly having diamond-shaped surface configurations. The connector supports 258, 260 may be made from steel or other material providing strength and support when disposed on a tow dolly, and may be welded to the main body portion 252, or otherwise rigidly disposed on the underside of the main body portion 252. Preferably, the connector supports 258, 260 may run the entirety of the width-wise distance of the main body portion 252. More preferably, the connector supports 258, 260 may run the entirety of the width wise distance of the main body portion 252 and the support bar 262, as illustrated in FIG. 6.

Figure 7:
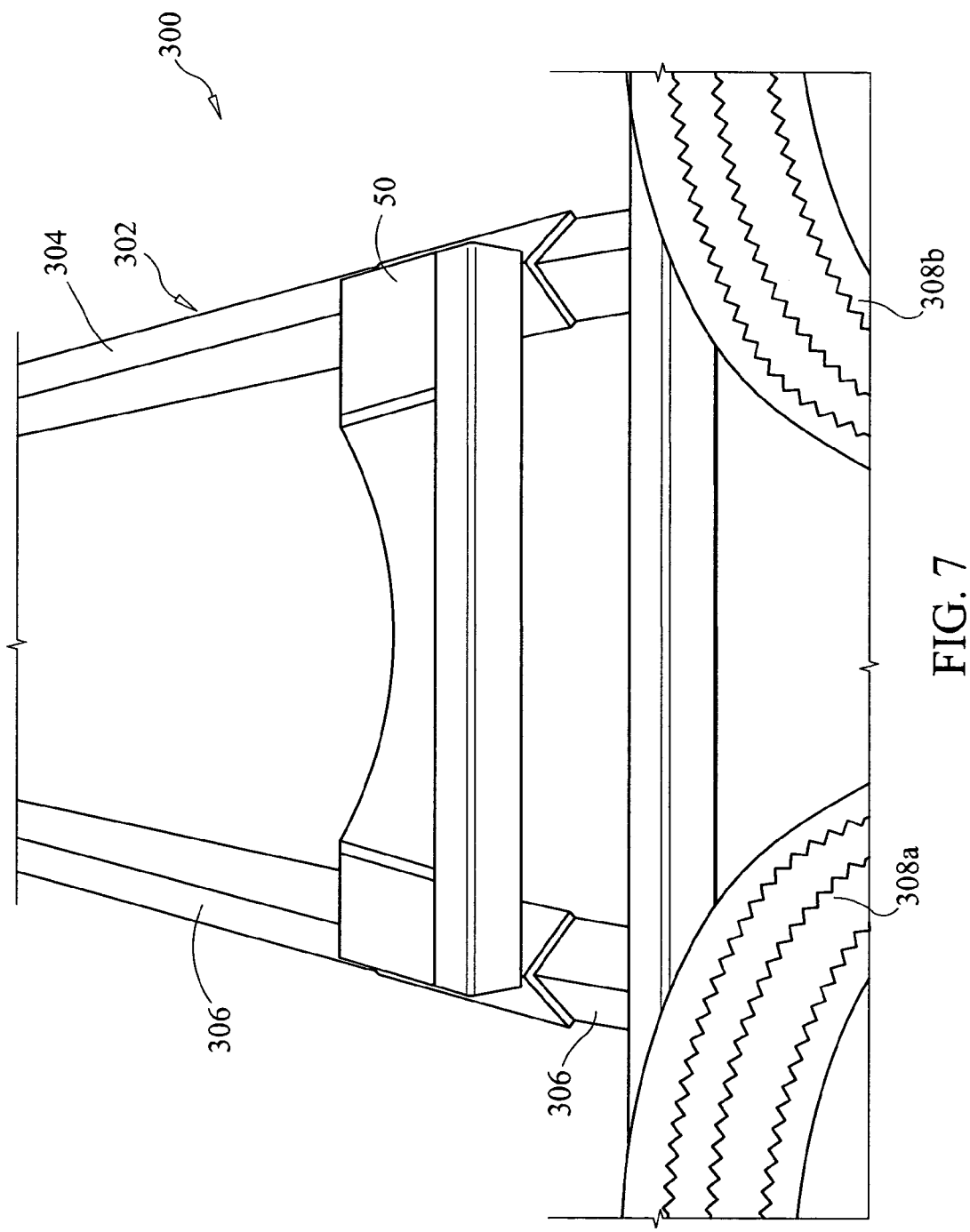
FIG. 7 illustrates a perspective view of a vehicle wheel hub cradle apparatus disposed on a tow dolly in an embodiment of the present invention.

FIG. 7 illustrates a system 300 of a cradle apparatus 250, as described above with respect to FIG. 6, disposed on support bars 304, 306 of a tow dolly. It should be noted that although the embodiment is shown and described herein with respect to cradle apparatus 250, cradle apparatus 200 may be utilized in place of cradle apparatus 250 as apparent to one having ordinary skill in the art.

Typically, a tow dolly has the support bars 304, 306 running generally parallel between sets of tires, including tires 308a, 308b. The support bars 304, 306 typically receive a tire of a vehicle between the support bars 304, 306. However, if the tire of the vehicle has been removed, delicate undercarriage parts of the vehicle may rest on the support bars 304, 306 thereby causing damage to the undercarriage parts of the vehicle.

The cradle apparatus 250 spans the space between the support bars 304, 306 to provide the cradle portion 254 for the wheel hub of a vehicle to rest on. As shown, the "V"-shaped connector supports 258, 260 may fit the diamond shapes of the support bars 304, 306.

Figure 8:
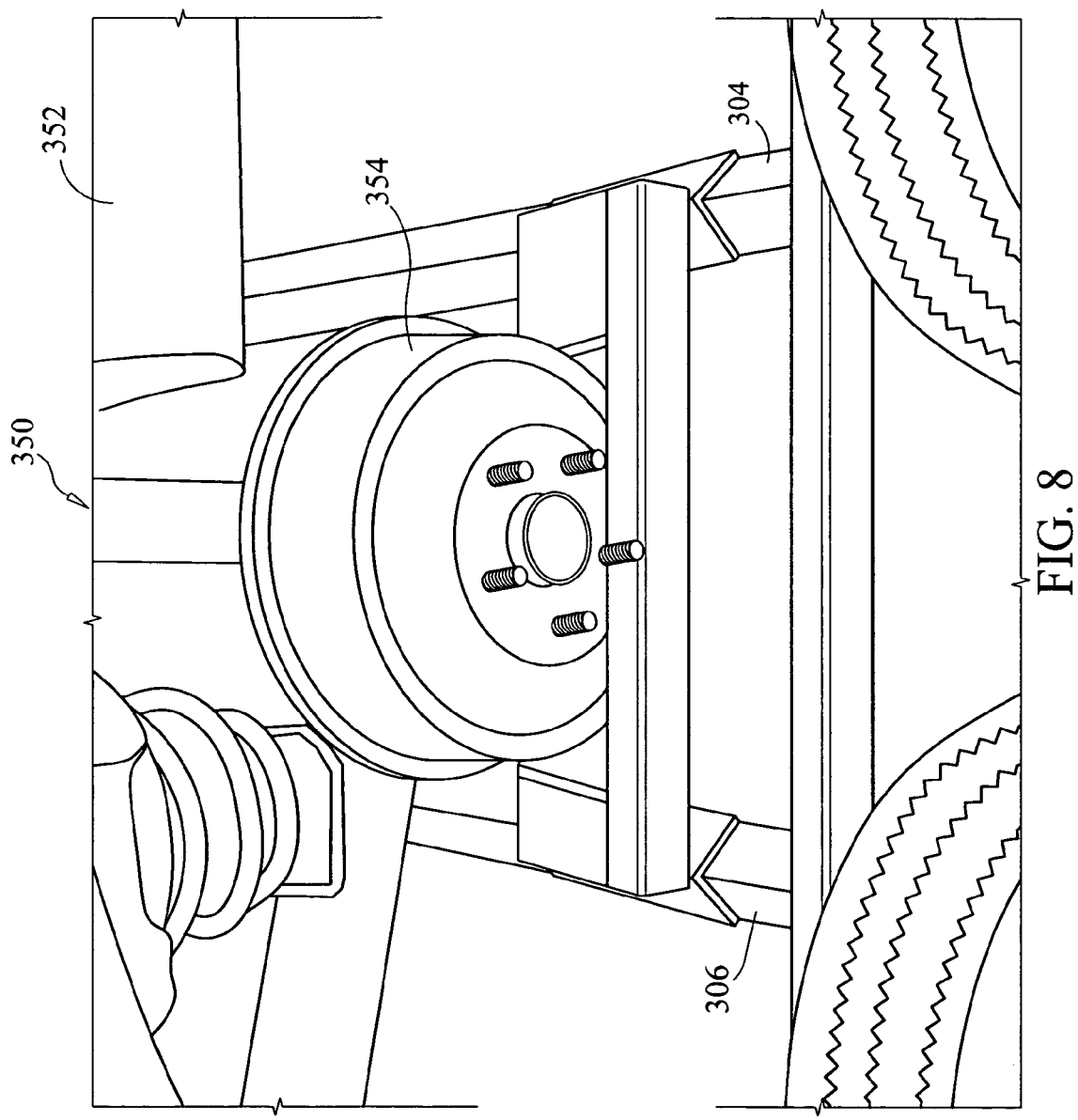
FIG. 8 illustrates a perspective view of a vehicle wheel hub cradle apparatus disposed on a tow dolly having a vehicle wheel hub disposed thereon in an embodiment of the present invention.

FIG. 8 illustrates a system 350 of a cradle apparatus 250 disposed on a tow dolly 302 having a vehicle 352 disposed thereon. Specifically, the cradle apparatus 250 is disposed on the tow dolly 302 as described above with respect to FIG. 7. A vehicle 352 may be disposed on the cradle apparatus 250. Specifically, a wheel hub 354 of the vehicle 352 may sit within the cradle portion 254 of the cradle apparatus 250. The cradle apparatus 250, therefore, may hold the weight of the vehicle 352 via the wheel hub 354. Without the cradle apparatus 250, the space between support bars 304, 306 would be too great to support the wheel hub, and delicate parts of the undercarriage of the vehicle 352 would rest on the support bars 304, 306, possibly damaging the delicate parts of the vehicle 352.

The cradle apparatuses 200 and 250 are generally symmetrical. Therefore, the cradle apparatuses 200, 250 may be utilized on either side of a tow dolly. For example, the cradle apparatus 200 may simply be utilized on either the right side or the left side of a tow dolly, depending on where an exposed wheel hub may be located. Moreover, cradle apparatus 250 may be reversed, such that the support bar 262 faces outwardly when the cradle apparatus 250 is disposed on an opposite side of the tow dolly. Therefore, separate right and left versions of the cradle apparatuses 200, 250 need not be produced.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

I claim:

1. An apparatus for holding a wheel hub of a vehicle, the apparatus comprising:
a main body portion having a first end, a second end and a length between the first end and the second end;
a well for receiving a wheel hub of a vehicle without a tire, the well disposed between the first end and the second end of the main body portion, the well having a radius of curvature and size corresponding to the wheel hub of the vehicle without the tire;
a first horizontal portion extending between the first end and the well and a second horizontal portion extending between the second end and the well; and
a first holder disposed beneath the main body portion at the first end of the main body portion, the first holder for contacting and resting on top of a first of a plurality of parallel bars of a towing device, the plurality of parallel bars sized for normally holding a vehicle tire when the vehicle has a tire on its wheel hub and further the plurality of parallel bars for holding the apparatus on the towing device when the apparatus is placed on the plurality of parallel bars,
wherein said well of the apparatus is disposed above the plurality of bars for holding the wheel hub of the vehicle without the tire above the plurality of bars when the wheel hub is received within the well.

2. The apparatus of claim 1 further comprising:
an elongated bar disposed adjacent the main body portion and the well.

3. The apparatus of claim 1 wherein the first holder comprises a flange disposed downwardly for contacting the towing device.

4. The apparatus of claim 1 further comprising:
a second holder disposed beneath the main body portion at the second end of the main body portion for contacting and resting on top of a second of the plurality of parallel bars of the towing device for holding the apparatus on the towing device.

5. A system for holding an exposed wheel hub of a vehicle for towing the vehicle comprising:
a towing device having a vehicle wheel receptacle comprising a first crossbar and a second crossbar and a space having a length between the first crossbar and the second crossbar for normally holding a vehicle tire of a vehicle; and
an apparatus comprising a main body portion having a length, a first end and a second end and a well for receiving a wheel hub of a vehicle without a tire, the well disposed between the first end and the second end of the main body portion, the well having a radius of curvature and size corresponding to the wheel hub of the vehicle without the tire, and further wherein the apparatus comprises a first horizontal portion extending between the first end and the well and a second horizontal portion extending between the second end and the well, wherein the apparatus rests on top of and spans the length of the space between the first crossbar and the second crossbar of the wheel receptacle and the well of the apparatus is disposed above the first crossbar and the second crossbar for holding the wheel hub of the vehicle without the tire above the first crossbar and the second crossbar.

6. The system of claim 5 further comprising:
a holder disposed beneath the main body portion at the first end of the main body portion of the apparatus for contacting and resting on top of the first crossbar of the wheel receptacle.

7. The system of claim 5 further comprising:
a first holder disposed beneath the main body portion at the first end of the main body portion of the apparatus for contacting and resting on the first crossbar of the wheel receptacle; and
a second holder disposed beneath the main body portion at the second end of the main body portion of the apparatus for contacting and resting on the second crossbar of the wheel receptacle.

8. The system of claim 5 wherein the towing device is a tow truck having a wheel lift, wherein the wheel receptacle is a wheel grid and further wherein the wheel receptacle is part of the wheel lift.

9. The system of claim 5 wherein the towing device is a tow dolly, wherein the wheel receptacle is part of the tow dolly.

10. The system of claim 5 further comprising:
a vehicle having an exposed wheel hub without a tire wherein the wheel hub is disposed within the well of the apparatus.

11. The system of claim 5 further comprising:
an elongated bar disposed adjacent the main body portion and the well.

12. A method for holding a wheel hub of a vehicle comprising the steps of:
providing a towing device having a vehicle wheel receptacle comprising a first crossbar and a second crossbar and a space having a length between the first crossbar and the second crossbar for normally holding a tire of a vehicle; and
placing an apparatus across the wheel receptacle and spanning the length of the space between the first crossbar and the second crossbar, the apparatus having a main body portion having a length, a first end and a second end and further wherein the apparatus has a well for receiving a wheel hub of a vehicle without a tire disposed between the first end and the second end of the apparatus, the well further having a radius of curvature and size corresponding to the wheel hub of the vehicle without the tire, and further wherein the apparatus comprises a first horizontal portion extending between the first end and the well and a second horizontal portion extending between the second end and the well, the apparatus contacting and resting on top of the first crossbar and the second crossbar, the well of the apparatus disposed above the first crossbar and the second crossbar for holding the wheel hub of the vehicle without the tire above the first crossbar and the second crossbar.

13. The method of claim 12 further comprising the steps of:
providing a vehicle having an exposed wheel hub; and
placing the wheel hub within the well of the apparatus.

14. The method of claim 12 further comprising the steps of:
providing a holder disposed beneath the main body portion at the first end of the main body portion of the apparatus; and
disposing the holder on top of the first crossbar of the wheel receptacle.

15. The method of claim 12 wherein the towing device is a tow truck having a wheel lift, wherein the wheel receptacle is a wheel grid and further wherein the wheel receptacle is part of the wheel lift.

16. The method of claim 12 wherein the towing device is a tow dolly, wherein the wheel receptacle is part of the tow dolly.

* * * * *